United States Patent
Hickman et al.

(10) Patent No.: US 11,110,343 B2
(45) Date of Patent: *Sep. 7, 2021

(54) METHODS AND SYSTEMS FOR GENERATING DETAILED DATASETS OF AN ENVIRONMENT VIA GAMEPLAY

(71) Applicant: Niantic, Inc., San Francisco, CA (US)

(72) Inventors: Ryan Michael Hickman, Sunnyvale, CA (US); Soohyun Bae, Los Gatos, CA (US)

(73) Assignee: Niantic, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/377,095

(22) Filed: Apr. 5, 2019

(65) Prior Publication Data
US 2019/0232157 A1    Aug. 1, 2019

Related U.S. Application Data

(63) Continuation of application No. 15/699,459, filed on Sep. 8, 2017, now Pat. No. 10,300,373.

(51) Int. Cl.
*A63F 13/655* (2014.01)
*G06K 9/00* (2006.01)
(Continued)

(52) U.S. Cl.
CPC .......... *A63F 13/213* (2014.09); *A63F 13/215* (2014.09); *A63F 13/25* (2014.09); *A63F 13/56* (2014.09); *A63F 13/60* (2014.09); *A63F 13/655* (2014.09); *G06F 16/51* (2019.01); *G06F 16/5838* (2019.01); *G06K 9/00315* (2013.01);
(Continued)

(58) Field of Classification Search
None
See application file for complete search history.

(56) References Cited

U.S. PATENT DOCUMENTS

| 9,824,477 B1 | 11/2017 | McDonald |
| 2012/0315992 A1 | 12/2012 | Gerson et al. |

(Continued)

FOREIGN PATENT DOCUMENTS

| CN | 104854564 A | 8/2015 |
| EP | 2963605 A1 | 1/2016 |

(Continued)

OTHER PUBLICATIONS

International Search Report and Written Opinion, PCT Application No. PCT/I B2018/056852, dated Dec. 19, 2018, 11 pages.

(Continued)

*Primary Examiner* — Damon J Pierce
(74) *Attorney, Agent, or Firm* — Fenwick & West LLP

(57) ABSTRACT

An example method includes obtaining, obtaining, from one or more sensors of a computing device, data relating to a feature in an environment. Following, the method includes analyzing the data to identify one or more details of the feature in the environment and determining, based on a comparison of the data to a stored dataset in a database, that the details includes a detail that the stored dataset lacks. The method includes providing one or more game elements for gameplay on an interface of the computing device based on the details including the detail that the stored dataset lacks.

20 Claims, 10 Drawing Sheets

(51) Int. Cl.

| | | |
|---|---|---|
| *A63F 13/213* | (2014.01) | |
| *G06T 7/00* | (2017.01) | |
| *G06K 9/62* | (2006.01) | |
| *A63F 13/215* | (2014.01) | |
| *A63F 13/25* | (2014.01) | |
| *A63F 13/56* | (2014.01) | |
| *A63F 13/60* | (2014.01) | |
| *G06F 16/583* | (2019.01) | |
| *G06F 16/51* | (2019.01) | |
| *G06K 9/20* | (2006.01) | |
| *G06T 15/00* | (2011.01) | |

(52) U.S. Cl.
CPC ..... *G06K 9/00335* (2013.01); *G06K 9/00671* (2013.01); *G06K 9/20* (2013.01); *G06K 9/6256* (2013.01); *G06T 7/00* (2013.01); *G06T 15/00* (2013.01)

(56) References Cited

U.S. PATENT DOCUMENTS

| | | |
|---|---|---|
| 2013/0044912 A1 | 2/2013 | Kulkarni et al. |
| 2014/0132633 A1 | 5/2014 | Fekete et al. |
| 2015/0002693 A1 | 1/2015 | Cabral et al. |
| 2015/0161444 A1 | 6/2015 | Gallup et al. |
| 2015/0193982 A1 | 7/2015 | Mihelich et al. |
| 2015/0317801 A1* | 11/2015 | Bentley ............. G08B 21/043 382/107 |
| 2016/0316334 A1 | 10/2016 | Lection et al. |
| 2018/0033177 A1* | 2/2018 | Han ..................... A63F 13/211 |
| 2018/0164879 A1 | 6/2018 | Moffat et al. |
| 2019/0065027 A1* | 2/2019 | Hauenstein ........... G06T 19/006 |

FOREIGN PATENT DOCUMENTS

| | | |
|---|---|---|
| JP | 2013-210795 A | 10/2013 |
| JP | 2014-531787 A | 11/2014 |
| JP | 2015-533540 A | 11/2015 |
| KR | 10/20150020497 A | 2/2015 |
| KR | 10-2016-0003553 A | 1/2016 |
| KR | 10-2016-0062294 A | 6/2016 |

OTHER PUBLICATIONS

United States Office Action, U.S. Appl. No. 15/699,459, dated Sep. 25, 2018, 12 pages.

European Paten Office, Extended European Search Report and Written Opinion. EP Application No. 18854832.5, dated Nov. 2, 2020, 12 pages.

Japan Patent Office, Office Action, JP Patent Application No. 2020-513820, dated Oct. 6, 2020, six pages.

Uchida, T., "Issues in Open Data Utilization and Their Proposal of usage model", IEICE Technical Report, The Institute of Electronics, Information and Communication Engineers, Feb. 22, 2016, vol. 115, No. 467, pp. 183-188.

European Patent Office, Supplementary European Search Report, European Patent Application No. 18854832.5, dated Jul. 31, 2020, 16 pages.

Simões, B. et al., "C-space: Fostering new creative paradigms based on recording and sharing "casual" videos through the internet," 2015, IEEE International Conference on Multimedia & Expo Workshops (ICMEW), 4 pages.

* cited by examiner

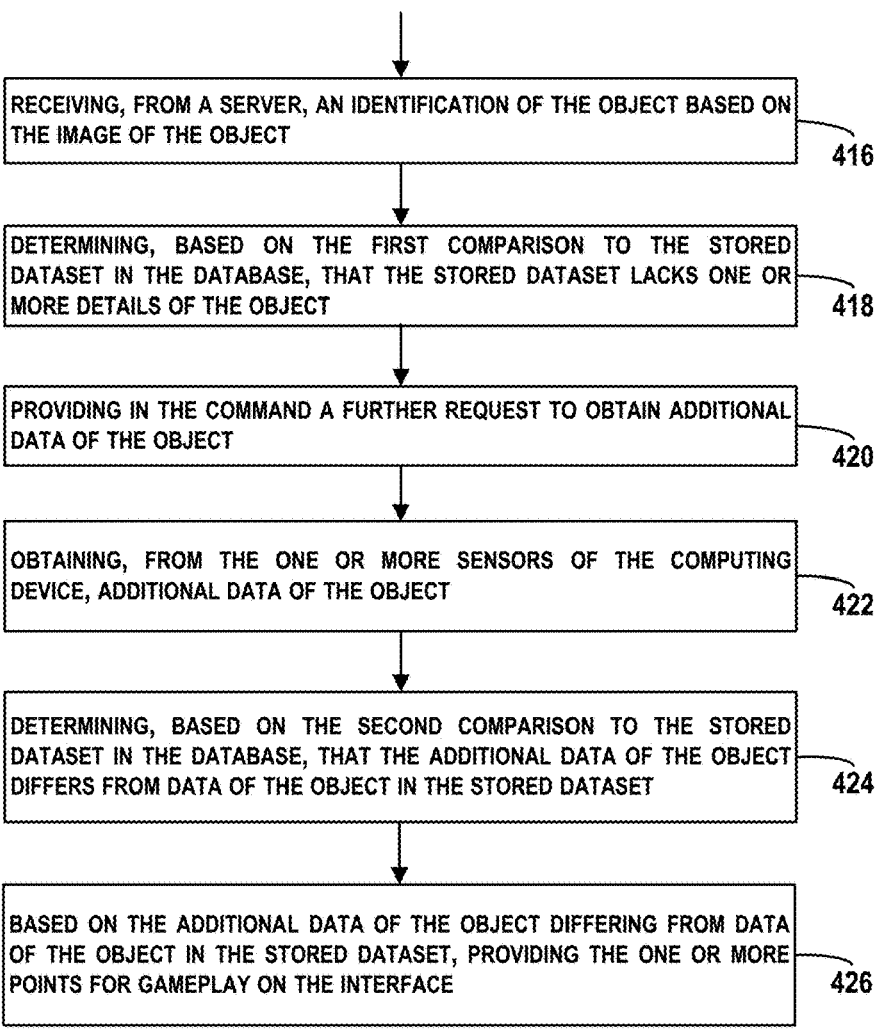
FIG. 5
FIG. 6
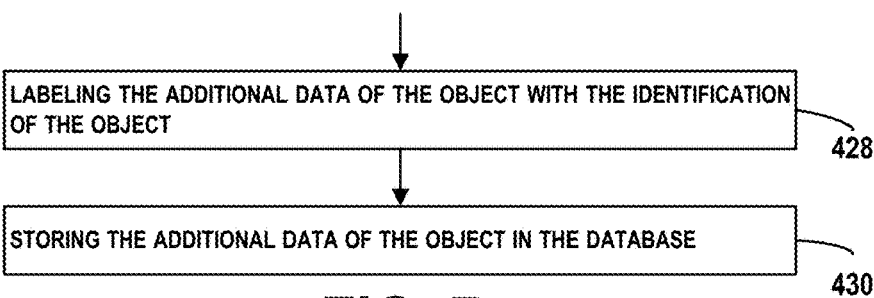
FIG. 7

METHODS AND SYSTEMS FOR GENERATING DETAILED DATASETS OF AN ENVIRONMENT VIA GAMEPLAY

CROSS REFERENCE TO RELATED APPLICATIONS

This application is a continuation application of prior, co-pending U.S. patent application Ser. No. 15/699,459 filed on Sep. 8, 2017, which is incorporated by reference.

FIELD

The present disclosure relates generally to methods of collection of data of an environment and/or of objects in the environment, and more particularly, to generating detailed datasets of the environment and/or the objects in the environment through use of incentivizing data collection with gameplay on an interface of a computing device.

BACKGROUND

A number of ways of gathering data of an environment and/or objects in the environment exist today, but most are time-consuming and costly due to individual data collectors traversing areas of interest to capture and collect data. The data captured includes images, for example, to generate maps of areas or to log an account of details of an area at a point in time.

Some data collection efforts of large areas have turned to use of crowdsourcing to reduce costs and have access to a larger pool of data collectors. However, issues still arise concerning questions about data quality and gaps in data collection. It is difficult to cause a pool of data collectors to work in unison and collect data in a geographical manner that traverses all areas of interest, and also, that collects all types of data of interest. Further, it is difficult to determine that all data of interest of objects in the environment has been captured and logged accordingly. Improvements are therefore desired.

SUMMARY

In one example, a computer-implemented method is described. The method comprises obtaining, from a camera of a computing device, an image of an environment, determining, based on a first comparison of the image to a stored dataset in a database, that the stored dataset lacks one or more details of the environment, and providing a command by the computing device that indicates a request to obtain additional data of the environment. The method also comprises in response to the command, obtaining, from one or more sensors of the computing device, additional data of the environment, determining, based on a second comparison to the stored dataset in the database, that the additional data of the environment differs from data of the environment in the stored dataset, and based on the additional data of the environment differing from data of the environment in the stored dataset, providing one or more points for gameplay on an interface of the computing device.

In another example, a computing device is described comprising a camera, one or more sensors, at least one processor, memory, and program instructions, stored in the memory, that upon execution by the at least one processor cause the computing device to perform operations. The operations comprise obtaining, from the camera, an image of an environment, determining, based on a first comparison of the image to a stored dataset in a database, that the stored dataset lacks one or more details of the environment, and providing a command that indicates a request to obtain additional data of the environment. The operations also comprises in response to the command, obtaining, from the one or more sensors, additional data of the environment, determining, based on a second comparison to the stored dataset in the database, that the additional data of the environment differs from data of the environment in the stored dataset, and based on the additional data of the environment differing from data of the environment in the stored dataset, providing one or more points for gameplay on an interface of the computing device.

In still another example, a non-transitory computer-readable medium is described having stored therein instructions, that when executed by a computing device, cause the computing device to perform functions. The functions comprise obtaining, from a camera of the computing device, an image of an environment, determining, based on a first comparison of the image to a stored dataset in a database, that the stored dataset lacks one or more details of the environment, and providing a command that indicates a request to obtain additional data of the environment. The functions also comprise in response to the command, obtaining, from one or more sensors of the computing device, additional data of the environment, determining, based on a second comparison to the stored dataset in the database, that the additional data of the environment differs from data of the environment in the stored dataset, and based on the additional data of the environment differing from data of the environment in the stored dataset, providing one or more points for gameplay on an interface of the computing device.

The features, functions, and advantages that have been discussed can be achieved independently in various examples or may be combined in yet other examples further details of which can be seen with reference to the following description and figures.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying figures, wherein:

FIG. 5 shows a flowchart of an example method for use with the method, according to an example implementation.

FIG. 6 shows another flowchart of an example method for use with the method, according to an example implementation.

FIG. 7 shows another flowchart of an example method for use with the method, according to an example implementation.

DETAILED DESCRIPTION

Figure 1:
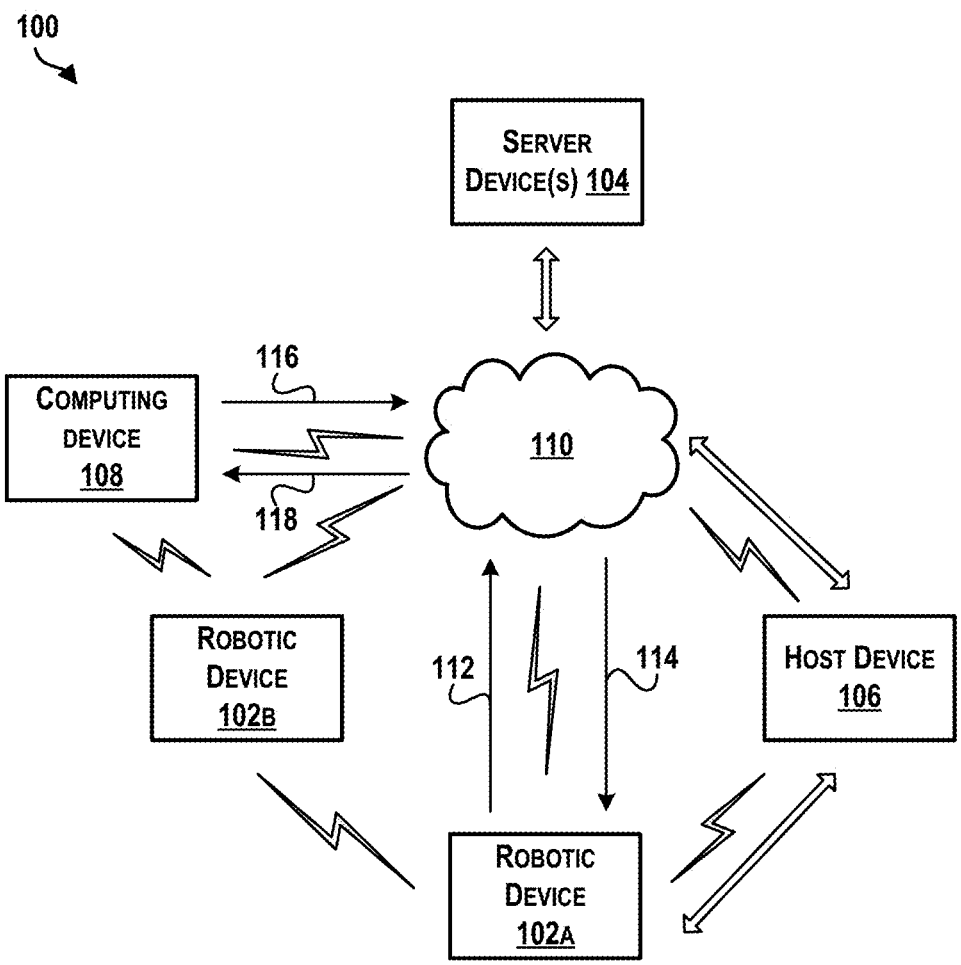
FIG. 1 illustrates an example system, according to an example implementation.

Disclosed examples will now be described more fully hereinafter with reference to the accompanying figures, in which some, but not all of the disclosed examples are shown. Indeed, several different examples may be provided and should not be construed as limited to the examples set forth herein. Rather, these examples are provided so that this disclosure will be thorough and complete and will fully convey the scope of the disclosure to those skilled in the art.

Described herein are systems and methods for gamification of data collection. One example computer-implemented method includes obtaining, from a camera of a computing device, an image of an environment and determining, based on a first comparison of the image to a stored dataset in a database, that the stored dataset lacks one or more details of the environment. Following, the computing device provides a command (e.g., audio or visual) that indicates a request to obtain additional data of the environment, and in response to the command, additional data of the environment can be obtained, from one or more sensors of the computing device. Next, the method includes determining, based on a second comparison to the stored dataset in the database, that the additional data of the environment differs from data of the environment in the stored dataset, and based on the additional data of the environment differing from data of the environment in the stored dataset, providing one or more points for gameplay on an interface of the computing device.

One example device includes a camera, one or more sensors, at least one processor, memory, and program instructions, stored in the memory, that upon execution by the at least one processor cause the computing device to perform operations. Those operations include functions for gamification of data collection.

In an example scenario, the computing device is programmed to ask questions to users to cause or incentivize data to be collected for a map of an entire environment (e.g., home), and provide feedback in the form of points for gameplay on the interface of the computing device. Gamification provides a motivation to participate, through in-game rewards and other feedback, such as encouragement (e.g., indications of "great job!"). Further, the computing device may be programmed to ask questions regarding details of an area to enable labeling of data that is collected (e.g., "who's room is this?"). When data is received at the computing that further completes the stored dataset, additional points and rewards are provided through the gameplay interface.

Advantageously, the systems and methods disclosed herein may facilitate data collection by providing the gameplay interface to make data collection fun and easy, and to also guide a user toward areas of interest (e.g., areas where the dataset is lacking details). Gamifying data collection creates an experience in which the user is guided to collect data of square footage of an environment, and when the data represents new square footage not previously collected, points/rewards are offered through the gameplay interface.

In further examples, a virtual game is created in which rewards/scores are provided to cause users to collect data that is valuable. A goal is to prompt users to collect data from unknown areas and/or to label data, which can ultimately be used to train various machine learning systems.

Various other features of these systems and methods are described hereinafter with reference to the accompanying figures.

Referring now to FIG. 1, an example system 100 is illustrated. In particular, FIG. 1 illustrates an example system 100 for data collection of an object(s) and/or of an environment(s). As shown in FIG. 1, system 100 includes robotic devices 102a, 102b, at least one server device 104, a host device 106, a computing device 108, and a communications network 110.

Robotic devices 102a, 102b may be any type of device that has at least one sensor and is configured to record sensor data in accordance with the embodiments described herein. In some cases, the robotic devices 102a, 102b, may also include locomotion capability (e.g., drive systems) that facilitate moving within an environment.

As shown in FIG. 1, robotic device 102a may send data 112 to and/or receive data 114 from the server device 104 and/or host device 106 via communications network 110. For instance, robotic device 102a may send a log of sensor data to the server device 104 via communications network 110. Additionally or alternatively, robotic device 102a may receive machine learning model data from server device 104. Similarly, robotic device 102a may send a log of sensor data to host device 106 via communications network 110 and/or receive machine learning model data from host device 106. Further, in some cases, robotic device 102a may send data to and/or receive data directly from host device 106 as opposed to via communications network 110.

Server device 104 may be any type of computing device configured to carry out computing device operations described herein. For example, server device 104 can include a remote server device and may be referred to as a "cloud-based" device. In some examples, server device 104 may include a cloud-based server cluster in which computing tasks are distributed among multiple server devices. In line with the discussion above, server device 104 may be configured to send data 114 to and/or receive data 112 from robotic device 102a via communications network 110. Server device 104 can include a machine learning server device that is configured to train a machine learning model.

Like server device 104, host device 106 may be any type of computing device configured to carry out the computing device operations described herein. However, unlike server device 104, host device 106 may be located in the same environment (e.g., in the same building) as robotic device 102a. In one example, robotic device 102a may dock with host device 106 to recharge, download, and/or upload data.

Although robotic device 102a is capable of communicating with server device 104 via communications network 110 and communicating with host device 106, in some examples, robotic device 102a may carry out the computing device operations described herein. For instance, robotic device 102a may include an internal computing system and memory arranged to carry out the computing device operations described herein.

In some examples, robotic device 102a may wirelessly communicate with robotic device 102b via a wireless interface. For instance, robotic device 102a and robotic device 102b may both operate in the same environment, and share data regarding the environment from time to time.

The computing device 108 may perform all functions as described with respect to the robotic devices 102a, 102b except that the computing device 108 may lack locomotion capability (e.g., drive systems) to autonomously move within an environment. The computing device 108 may take the form of a desktop computer, a laptop computer, a mobile phone, a PDA, a tablet device, a smart watch, wearable computing device, handheld camera computing device, or any type of mobile computing device, for example. The computing device 108 may also send data 116 to and/or receive data 118 from the server device 104 via communications network 110.

The communications network 110 may correspond to a local area network (LAN) a wide area network (WAN), a corporate intranet, the public internet, or any other type of network configured to provide a communications path between devices. The communications network 110 may also correspond to a combination of one or more LANs, WANs, corporate intranets, and/or the public Internet. Communications among and between the communications network 110 and the robotic device 102a, the robotic device 102b, and the computing device 108 may be wireless communications (e.g., WiFi, Bluetooth, etc.).

Figure 2:
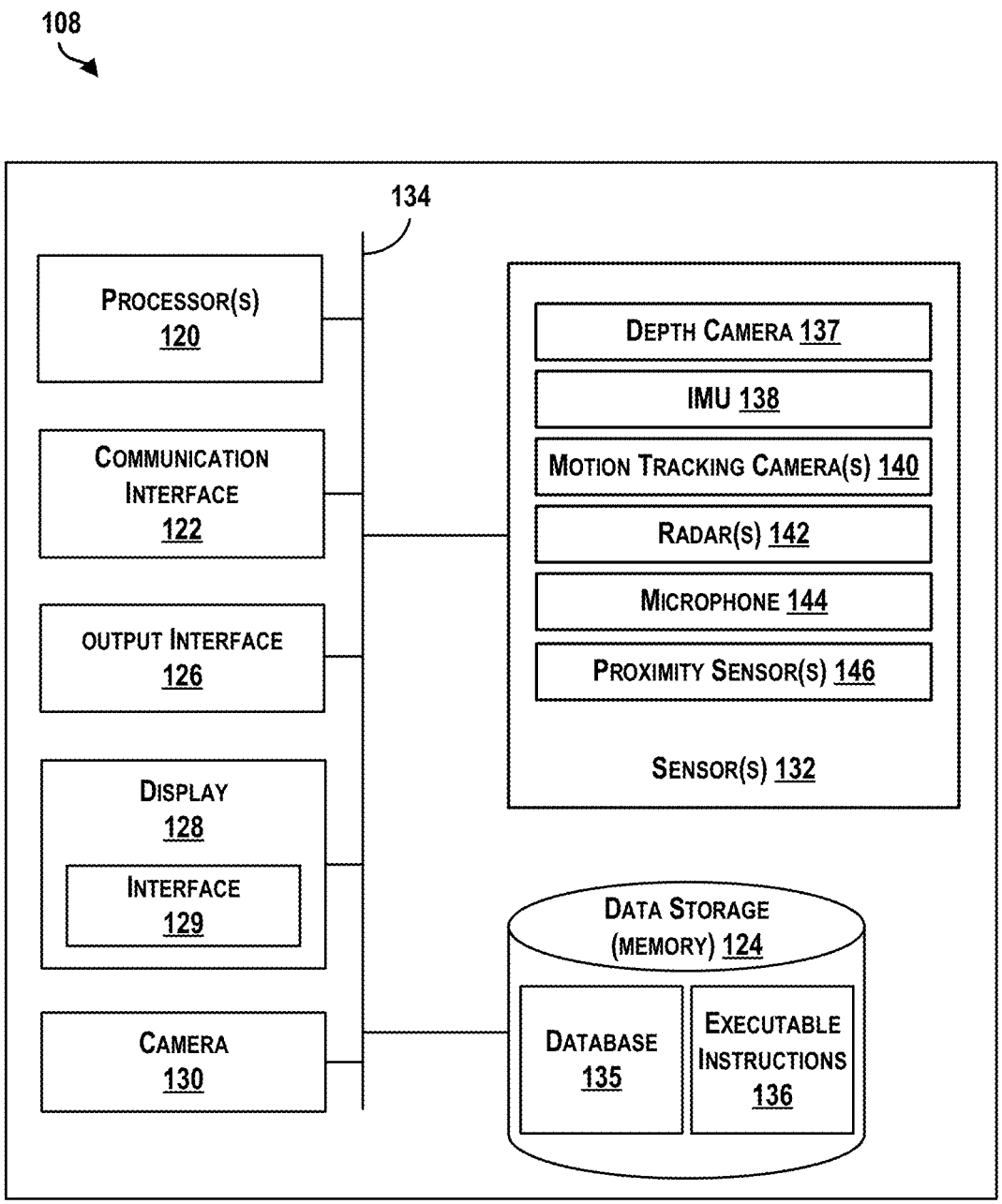
FIG. 2 illustrates an example of the computing device, according to an example implementation.

FIG. 2 illustrates an example of the computing device 108, according to an example embodiment. FIG. 2 shows some of the components that could be included in the computing device 108 arranged to operate in accordance with the embodiments described herein. The computing device 108 may be used to perform functions of methods as described herein.

The computing device 108 is shown to include a processor(s) 120, and also a communication interface 122, data storage (memory) 124, an output interface 126, a display 128, a camera 130, and sensors 132 each connected to a communication bus 134. The computing device 108 may also include hardware to enable communication within the computing device 108 and between the computing device 108 and other devices (not shown). The hardware may include transmitters, receivers, and antennas, for example.

The communication interface 122 may be a wireless interface and/or one or more wireline interfaces that allow for both short-range communication and long-range communication to one or more networks or to one or more remote devices. Such wireless interfaces may provide for communication under one or more wireless communication protocols, such as Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces may include Ethernet interface, a Universal Serial Bus (USB) interface, or similar interface to communicate via a wire, a twisted pair of wires, a coaxial cable, an optical link, a fiber-optic link, or other physical connection to a wireline network. Thus, the communication interface 122 may be configured to receive input data from one or more devices, and may also be configured to send output data to other devices.

The communication interface 122 may also include a user-input device, such as a keyboard, mouse, or touchscreen, for example.

The data storage 124 may include or take the form of one or more computer-readable storage media that can be read or accessed by the processor(s) 120. The computer-readable storage media can include volatile and/or non-volatile storage components, such as optical, magnetic, organic or other memory or disc storage, which can be integrated in whole or in part with the processor(s) 120. The data storage 124 is considered non-transitory computer readable media. In some examples, the data storage 124 can be implemented using a single physical device (e.g., one optical, magnetic, organic or other memory or disc storage unit), while in other examples, the data storage 124 can be implemented using two or more physical devices.

The data storage 124 is shown to include a database 135, which may store datasets of objects and/or environments. The datasets include data of the objects and/or environments that have been collected, and may include any type or number of data.

The data storage 124 thus is a non-transitory computer readable storage medium, and executable instructions 136 are stored thereon. The instructions 136 include computer executable code. When the instructions 136 are executed by the processor(s) 120, the processor(s) 120 are caused to perform functions. Such functions include e.g., obtaining, from the camera 130, an image of an environment, determining, based on a first comparison of the image to a stored dataset in the database 135, that the stored dataset lacks one or more details of the environment, providing a command that indicates a request to obtain additional data of the environment, in response to the command, obtaining, from the one or more sensors 132, additional data of the environment, determining, based on a second comparison to the stored dataset in the database 135, that the additional data of the environment differs from data of the environment in the stored dataset, and based on the additional data of the environment differing from data of the environment in the stored dataset, providing one or more points for gameplay on an interface 129 of the computing device 108. These functions are described in more detail below.

The processor(s) 120 may be a general-purpose processor or a special purpose processor (e.g., digital signal processors, application specific integrated circuits, etc.). The processor(s) 120 can include one or more CPUs, such as one or more general purpose processors and/or one or more dedicated processors (e.g., application specific integrated circuits (ASICs), digital signal processors (DSPs), network processors, etc.). For example, the processor(s) 170 can include a tensor processing unit (TPU) for training and/or inference of machine learning models. The processor(s) 120 may receive inputs from the communication interface 122, and process the inputs to generate outputs that are stored in the data storage 124 and output to the display 128. The processor(s) 120 can be configured to execute the executable instructions 136 (e.g., computer-readable program instructions) that are stored in the data storage 124 and are executable to provide the functionality of the computing device 108 described herein.

The output interface 126 outputs information to the display 128 or to other components as well. Thus, the output interface 126 may be similar to the communication interface 122 and can be a wireless interface (e.g., transmitter) or a wired interface as well.

The display 128 includes the interface 129. The interface 129 may be or include a graphical user interface (GUI) for display on the display 128. The interface 129 enables a user to interact with a visual display and accepts user inputs/instructions to illustrate and collect data in a desired manner. The interface 129 may be a GUI of a standard type of user interface allowing a user to interact with a computer that employs graphical images in addition to text to represent information and actions available to the user. Actions may be performed through direct manipulation of graphical elements, which include windows, buttons, menus, and scroll bars, for example.

The camera 130 may include a high-resolution camera to capture 2D images of objects and environment.

The sensors 132 include a number of sensors such as a depth camera 137, an inertial measurement unit (IMU) 138, one or more motion tracking cameras 140, one or more radars 142, one or more microphone arrays 144, and one or more proximity sensors 146. More or fewer sensors may be included as well.

Depth camera 137 may be configured to recover information regarding depth of objects in an environment, such as three-dimensional (3D) characteristics of the objects. For example, depth camera 137 may be or include an RGB-infrared (RGB-IR) camera that is configured to capture one or more images of a projected infrared pattern, and provide the images to a processor that uses various algorithms to triangulate and extract 3D data and outputs one or more RGBD images. The infrared pattern may be projected by a projector that is integrated with depth camera 137. Alternatively, the infrared pattern may be projected by a projector that is separate from depth camera 137 (not shown).

IMU 138 may be configured to determine a velocity and/or orientation of the robotic device. In one example, IMU may include a 3-axis gyroscope, a 3-axis accelerometer, a 3-axis compass, and one or more processors for processing motion information.

Motion tracking camera 140 may be configured to detect and track movement of objects by capturing and processing images (e.g., RGB-IR images). In some instances, the motion tracking camera 140 may include one or more IR light emitting diodes (LEDs) that enable detection in low-luminance lighting conditions. Motion tracking camera 140 may include a wide field of view (FOV), such as a 180 degree FOV. In one example configuration, the computing device 108 may include a first motion tracking camera configured to capture images on a first side of the computing device 108 and a second motion tracking camera configured to capture images on an opposite side of the computing device 108.

Radar 142 may include an object-detection system that uses electromagnetic waves to determine a range, angle, or velocity of objects in an environment. Radar 142 may operate by firing laser pulses out into an environment, and measuring reflected pulses with one or more sensors. In one example, radar 142 may include a solid-state millimeter wave radar having a wide FOV, such as a 150 degree FOV.

Microphone 144 may include a single microphone or a number of microphones (arranged as a microphone array) operating in tandem to perform one or more functions, such as recording audio data. In one example, the microphone 144 may be configured to locate sources of sounds using acoustic source localization.

Proximity sensor 146 may be configured to detect a presence of objects within a range of the computing device 108. For instance, proximity sensor 146 can include an infrared proximity sensor. In one example, the computing device 108 may include multiple proximity sensors, with each proximity sensor arranged to detect objects on different sides of the computing device 108 (e.g., front, back, left, right, etc.).

Figure 3:
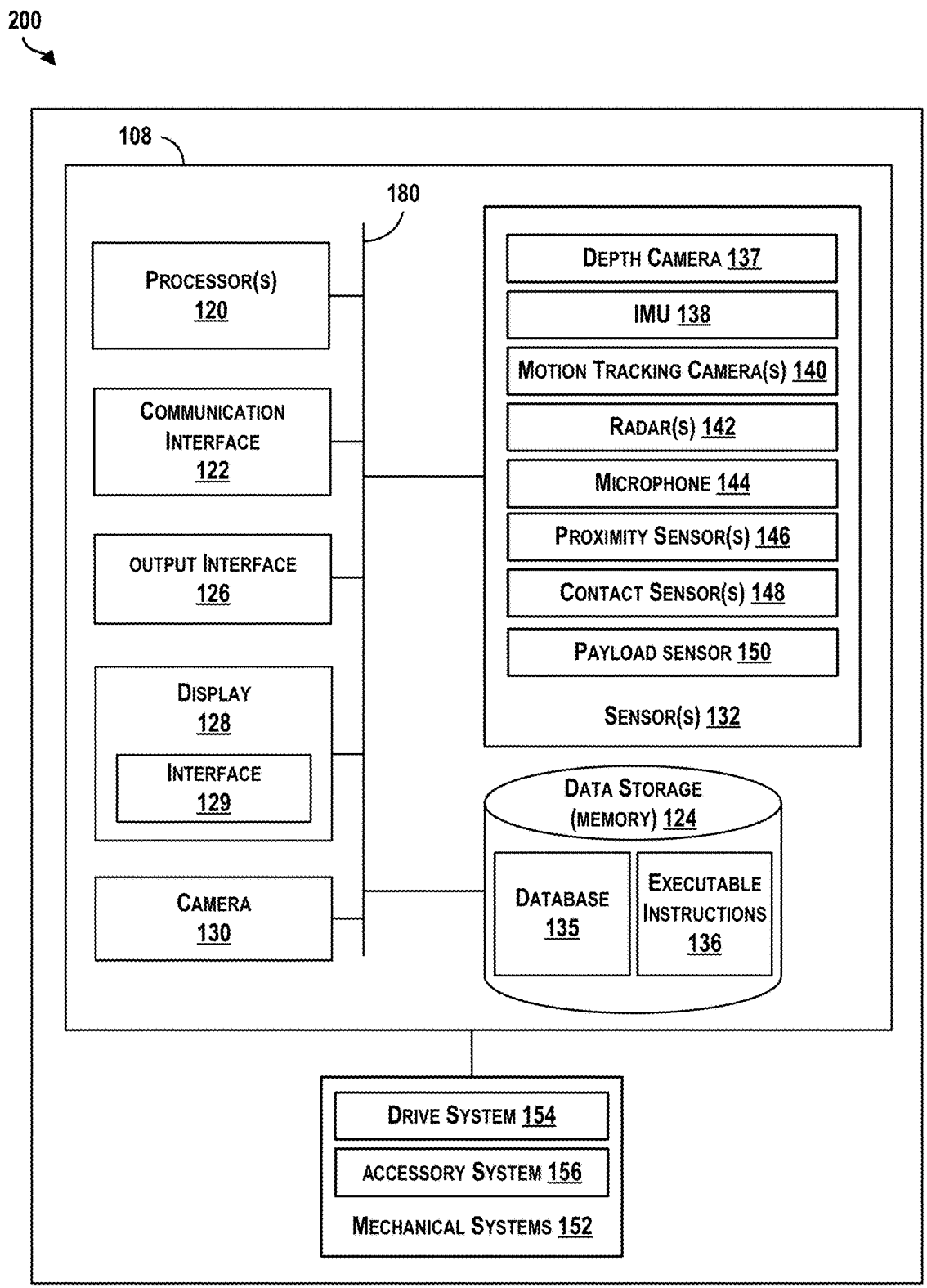
FIG. 3 illustrates an example of a robotic device, according to an example implementation.

FIG. 3 illustrates an example of a robotic device 200, according to an example embodiment. FIG. 2 shows some of the components that could be included in the robotic device 200 arranged to operate in accordance with the embodiments described herein. The robotic device 200 may be used to perform functions of methods as described herein.

The robotic device 200 may include the same or similar components of the computing device 108 (and/or may include a computing device 108) including the processor(s) 120, the communication interface 122, the data storage (memory) 124, the output interface 126, the display 128, the camera 130, and the sensors 132 each connected to the communication bus 134. Description of these components is the same as above for the computing device 108. The robotic device 200 may also include hardware to enable communication within the robotic device 200 and between the robotic device 200 and other devices (not shown). The hardware may include transmitters, receivers, and antennas, for example.

In some examples, the robotic device 200 also includes the interface 129 for gameplay to illustrate points awarded. In other examples, the robotic device 200 may be used additionally or alternatively to the computing device 108 of FIG. 2 (which may be in the form of a smartphone) for data collection, and the robotic device 200 may communicate wirelessly to the computing device 108 to inform of success of the data collection for awarding points during gameplay. The interface 129 on the display 128 of the computing device in FIG. 2 may then illustrate the points, for example.

The robotic device 200 may also include additional sensors 132, such as contact sensor(s) 148 and a payload sensor 150.

Contact sensor(s) 148 may be configured to provide a signal when robotic device 200 contacts an object. For instance, contact sensor(s) 148 may be a physical bump sensor on an exterior surface of robotic device 200 that provides a signal when contact sensor(s) 148 comes into contact with an object.

Payload sensor 150 may be configured to measure a weight of a payload carried by robotic device 200. For instance, payload sensor 150 can include a load cell that is configured to provide an electrical signal that is proportional to a force being applied to platform or other surface of robotic device 200.

As further shown in FIG. 3, the robotic device 200 also includes mechanical systems 152 coupled to the computing device 108, and the mechanical systems 152 include a drive system 154 and an accessory system 156. Drive system 154 may include one or more motors, wheels, and other components that can be controlled to cause robotic device 200 to move through an environment (e.g., move across a floor). In one example, drive system 154 may include an omnidirectional drive system that can be controlled to cause robotic device 200 to drive in any direction.

Accessory system 156 may include one or more mechanical components configured to facilitate performance of an accessory task. As one example, accessory system 156 may include a motor and a fan configured to facilitate vacuuming. For instance the electric motor may cause the fan to rotate in order to create suction and facilitate collecting dirt, dust, or other debris through an intake port. As another example, the accessary system 156 may include one or more actuators configured to vertically raise a platform or other structure of robotic device 200, such that any objects placed on top of the platform or structure are lifted off of the ground. In one example, accessory system 156 may be configured to lift a payload of about 10 kilograms. Other examples are also possible depending on the desired activities for the robotic device 200.

Within examples, the computing device 108 may be used by a user and/or the robotic devices 102a, 102b can be programmed to collect data as functions of gameplay on an interface of the computing device 108 and/or the robotic devices 102a, 102b. In an example scenario, object recognizers can be referenced (e.g., through the server device(s) 104 and/or on-board the computing device 108 and the robotic devices 102a, 102b) to spot an object in an image for which more information is desired (e.g., more poses of the object). The computing device 108 can then provide a command informing the user to capture additional poses of the object. The command can be provided as an instruction during gameplay of a game on the computing device 108. With successful capture of the new poses, rewards/scores are provided to the user in the game to incentivize collection of the data. As a specific example, during gameplay, a user walks into a home and the computing device 108 obtains an image frame of a portion of a room. A cloud object recognizer determines that the image frame includes a fireplace, and the computing device 108 through the game provides a command asking the user to go closer to the fireplace to capture images from many different angles. Upon successful capture of the new image frames, points can be awarded to the user's score on the game.

As used herein, the term gameplay may refer to execution of an application on a computing device in which the computing device is programmed to request inputs and provide incentives to users to complete tasks to cause the computing device to collect or gather the requested inputs. The gameplay can also include strategic challenges for a user to satisfy to receive the incentivized awards, such as collecting certain data or images of physical objects in the real world to receive the awards. The awards can be real, in terms of monetary provided by a service provider, or imaginary in terms of points on a GUI to increase a score for a user, for example. Thus, the term gameplay includes execution of gaming applications (e.g., including a user/player using a computing device to execute an application that has associated rules for gaming) as well as execution of other applications that have similarly associated rules for types of simulations, for example.

Figure 4:
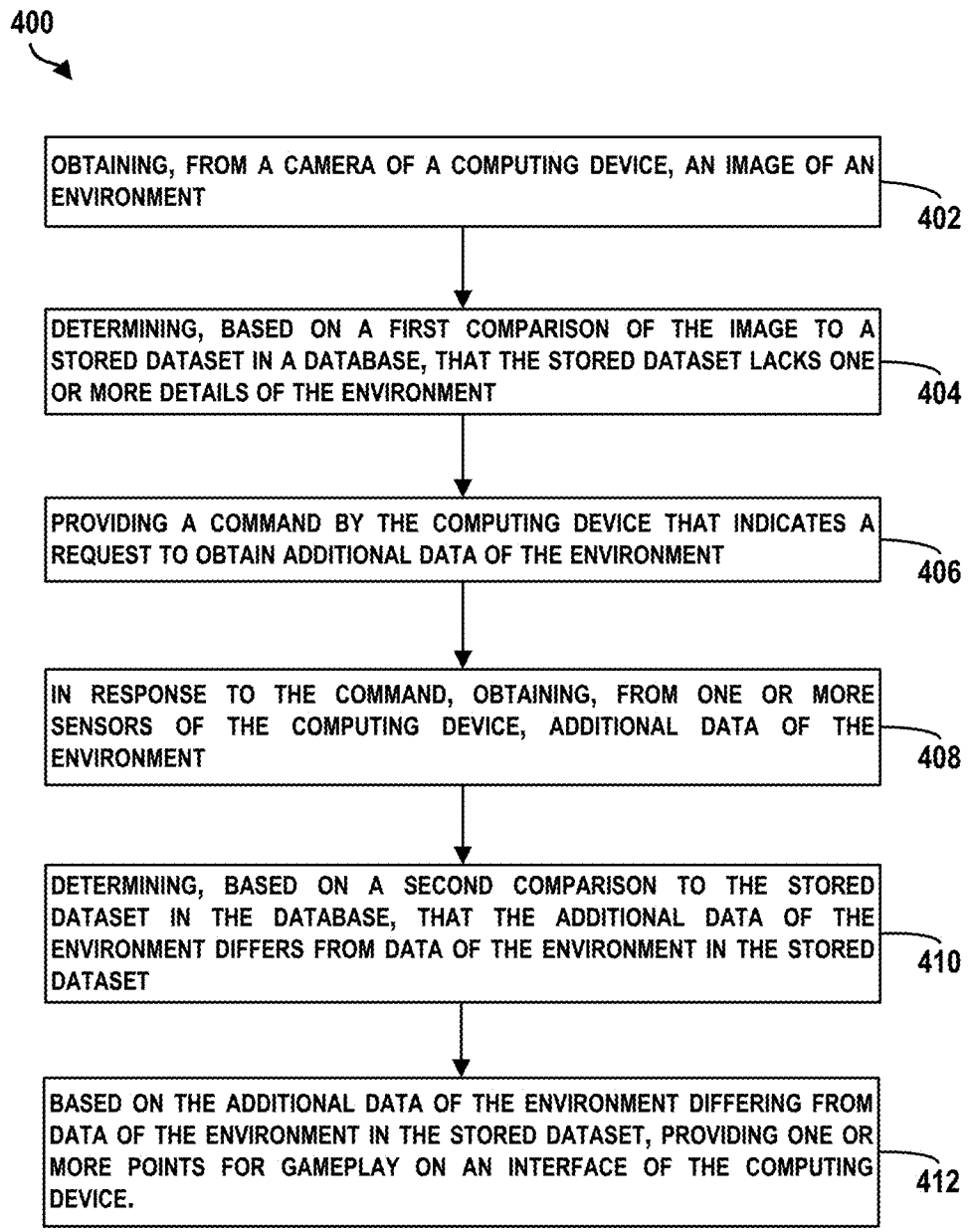
FIG. 4 shows a flowchart of an example method, according to an example implementation.

FIG. 4 shows a flowchart of an example method 400, according to an example implementation. Method 400 shown in FIG. 4 presents an embodiment of a method that, for example, could be carried out by a computing device or a robotic device, such as any of the computing devices or robotic devices depicted in any of the Figures herein. As such, the method 400 may be a computer-implemented method. It should be understood that for this and other processes and methods disclosed herein, flowcharts show functionality and operation of one possible implementation of present embodiments. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

Method 400 may include one or more operations, functions, or actions as illustrated by one or more of blocks 402-412. It should be understood that for this and other processes and methods disclosed herein, flowcharts show functionality and operation of one possible implementation of present examples. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in FIG. 4, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

The method 400 in FIG. 4 may be performed by the computing device 108, by the robotic devices 102a, 102b, and/or by a combination of the computing device 108 and the robotic devices 102a, 102b. Below, the method 400 is described in an example scenario as being performed by the computing device 108, which can also be considered a portion of the robotic devices 102a, 102b (as described with reference to FIG. 3).

In some examples, the method 400 may be executed as a game being played on the computing device 108, or portions of the method 400 may be functions of gameplay of the game.

At block 402, the method 400 includes obtaining, from the camera 130 of the computing device 108, an image of an environment. For example, a user may use the computing device 108 to capture an image of an object.

At block 404, the method 400 includes determining, based on a first comparison of the image to a stored dataset in the database 135, that the stored dataset lacks one or more details of the environment. In some examples, the database 135 storing the dataset may also be within the server device(s) 104, and thus, the computing device 108 may send the image to the server device(s) 104 for the first comparison to occur.

The first comparison may involve an object recognition of objects in the image. For example, reference to a cloud object recognizer can be made to determine that the image includes an image of an object. Following, the first comparison can include determining if the stored dataset includes any images of the recognized objects, and if so, how many images and types of images are included. As an example, the first comparison can include determining if a threshold number of poses of the object are stored in the dataset, and the threshold can be any number (e.g., such as 15-20, or possible over 100 poses). The first comparison may also determine is a threshold number of images (e.g., 20, 30, or at least 50 images) of the environment and/or object are included in the dataset, for example.

The first comparison can also include determining if the types of images include a variety of types, such as color, black and white, depth images, etc. The first comparison may further include determining that other types of data of the object and/or of the environment are lacking in the stored dataset, such as data of a surrounding area, data specific to the object itself (e.g., manufacturer, model number, year of manufacture, etc.), data relating to audio of the object or audio of a surrounding area of the object, data referring to an owner of the object or a location of the object, or any type and/or amount of data related to the object in any way.

In one example, the stored dataset may include a floorplan of the environment, and the first comparison can be made to determine whether the floorplan is complete or missing data as to any portions of the environment.

The first comparison thus can be determined based on a number of criteria, and thresholds can be set as desired when comparing to the stored dataset to make the determination of whether the dataset lacks details. In some examples, the first comparison may always determine that the dataset lacks details, such that for gameplay, this challenges the user to attempt to capture some "new" data of the environment and/or object (as described below).

A goal of the dataset stored in the database 135 is to fully describe the object and/or environment with all types of data available (e.g., image, audio, video, etc.) such that a full dataset is generated to represent the environment and object, and thus, the first comparison may result in determinations that the dataset lacks details at least of one aspect of the environment and/or object.

Alternatively, in some examples, when the dataset is robust, the first comparison can result in no lack of details being present, and gameplay can continue through capture of additional images for use in further first comparisons.

At block 406, the method 400 includes providing a command by the computing device 108 that indicates a request to obtain additional data of the environment. Once it is determined that the dataset lacks some detail, the computing device 108 provides the command either through a textual graphic on the interface 129 during gameplay, or as an audio command during gameplay. The command indicates to the user to attempt to obtain additional data of the environment, and/or of the object. In one example, the command indicates one or more areas of the environment at which to obtain the additional data of the environment. In another example in which the environment includes a house, the command provides information indicating a request to obtain additional data of a specific room in the house. The command may further indicate a specific type of data to collect, such as depth images, audio data, 2D image data, etc.

At block 408, the method 400 includes in response to the command, obtaining, from one or more sensors 132 of the computing device 108, additional data of the environment. The additional data can include obtaining one or more depth images of the environment, obtaining, using the microphone 144, audio from the environment, obtaining radar data using the radar 142, etc. Thus, during gameplay, the user may utilize the computing device 108 to capture any and all types of data available through use of the sensor(s) 132.

At block 410, the method 400 includes determining, based on a second comparison to the stored dataset in the database 135, that the additional data of the environment differs from data of the environment in the stored dataset. The second comparison can be performed to determine if the additional data that is newly captured differs or varies in any way from the data stored in the dataset. Data may be considered to differ if it varies by any amount, such as capturing a new image not previously stored in the dataset, new audio not previously stored in the dataset, new information of the object/environment not previously stored in the dataset, a new type of data not previously stored (e.g., the stored dataset only includes image data and the additional data includes audio), etc.

In other examples, the second comparison may use a differentiation threshold to determine if the additional data differs from that as stored in the dataset. The differentiation threshold can be set to any level, and may vary based on the type of data. For example, for image data, a differentiation threshold can be set to be a difference in intensity of pixels of more than 50%, a difference in color of at least 50% of the pixels, a difference in content of at least 10% of the pixels in an image, etc.

The differentiation threshold may also be a number of objects determined in the image that differs from a number of objects in stored images. For example, if the additional data includes an image, a cloud object recognizer can be utilized to determine how many objects are in the image. When more objects are recognized in the image than are stored in the dataset for this environment, the differentiation threshold may be met.

At block 412, the method 400 includes based on the additional data of the environment differing from data of the environment in the stored dataset, providing one or more points for gameplay on the interface 129 of the computing device 108. Any type of points or other game elements may be provided during the gameplay, such as points awarded or added to a score, an achievement such as a reward of a badge, a level up or increased ranking on a leaderboard, etc.

The gameplay may set certain time restrictions at which the user must return to complete an action or task to receive a reward. This encourages users to play the game on a regular basis to capture additional data to be eligible to receive the rewards. Similarly, the gameplay may set a limited time to complete a task FIG. 5 shows a flowchart of an example method for use with the method 400, according to an example implementation. At block 414, functions include generating a floorplan of the environment based on the additional data of the environment. For example, the command may guide the user to collect data over areas of interest of the environment to enable enough data to be collected to generate a floorplan.

In this example, the commands can request data collection of all rooms of a house, and the gameplay may include a checklist of traditional rooms in a house (e.g., kitchen, family room, bedroom(s)), and once the checklist is completed, a generic floorplan can be created.

FIG. 6 shows another flowchart of an example method for use with the method 400, according to an example implementation. At block 416, functions include receiving, from the server 104, an identification of the object based on the image of the object. At block 418, functions include determining, based on the first comparison to the stored dataset in the database 135, that the stored dataset lacks one or more details of the object, and at block 420, functions include providing in the command a further request to obtain additional data of the object. Following, at blocks 422, 424, and 426, functions include obtaining, from the one or more sensors 132 of the computing device 108, additional data of the object, determining, based on the second comparison to the stored dataset in the database 135, that the additional data of the object differs from data of the object in the stored dataset, and based on the additional data of the object differing from data of the object in the stored dataset, providing the one or more points for gameplay on the interface 129. In this example, the command may provide information indicating a pose of the object at which to obtain the additional data of the object or providing a time of day at which to obtain the additional data of the object (so as to capture data of the object with different lighting).

FIG. 7 shows another flowchart of an example method for use with the method 400, according to an example implementation. At block 428, functions include labeling the additional data of the object with the identification of the object, and at block 430, functions include storing the additional data of the object in the database 135. In this example, as new additional data is received, the computing device 108 may perform an object recognition, as possible, of content in images. If any object is unable to be recognized, the computing device 108 may prompt the user to label the object.

Similarly, the computing device 108 may prompt the user to label the new additional data for all newly received data. In an example scenario, the new data may represent a room in the house, and the prompt may request an identification of a person to associate with this room. Or, the new data may represent an object (e.g., shoes), and the prompt may request an identification of an owner of the object.

Figure 8:
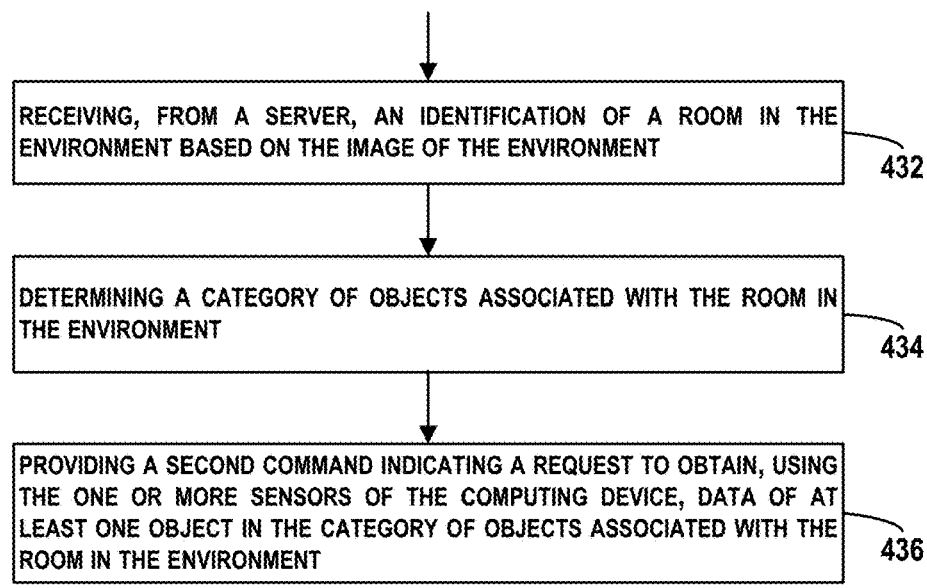
FIG. 8 shows another flowchart of an example method for use with the method, according to an example implementation.

FIG. 8 shows another flowchart of an example method for use with the method 400, according to an example implementation. At block 432, functions include receiving, from the server 104, an identification of a room in the environment based on the image of the environment. At block 434, functions include determining a category of objects associated with the room in the environment. At block 436, functions include providing a second command indicating a request to obtain, using the one or more sensors 132 of the computing device 108, data of at least one object in the category of objects associated with the room in the environment. In an example scenario, as the computing device 108 recognizes that the user has walked into an office in the house, either via location determination, reference to a floorplan, or object recognition of objects in the office, the computing device 108 may then determine office supplies as a category of objects and provide a command during gameplay indicating a request to obtain data of specific office supplies for which the dataset in the database 135 may be lacking details. The user can then capture data of the requested office supplies to earn additional points and rewards during gameplay.

Thus, as the user walks throughout an environment, the computing device 108 determines a location of the computing device 108 and determines objects associated with that location for which the dataset lacks details. This enables the computing device 108 to request additional data of specific objects that are highly relevant to a location of the computing device 108, and that are also lacking detail in the dataset.

Figure 9:
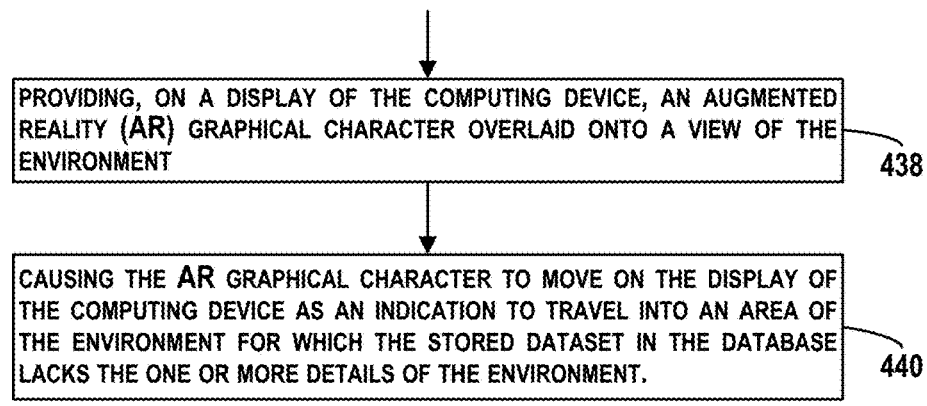
FIG. 9 shows another flowchart of an example method for use with the method, according to an example implementation.

FIG. 9 shows another flowchart of an example method for use with the method 400, according to an example implementation. At block 438, functions include providing, on the display 128 of the computing device 108, an augmented reality (AR) graphical character overlaid onto a view of the environment, and at block 440, functions include causing the AR graphical character to move on the display 128 of the computing device 108 as an indication to travel into an area of the environment for which the stored dataset in the database 135 lacks the one or more details of the environment. Examples are described below with reference to FIG. 21.

Figure 10:
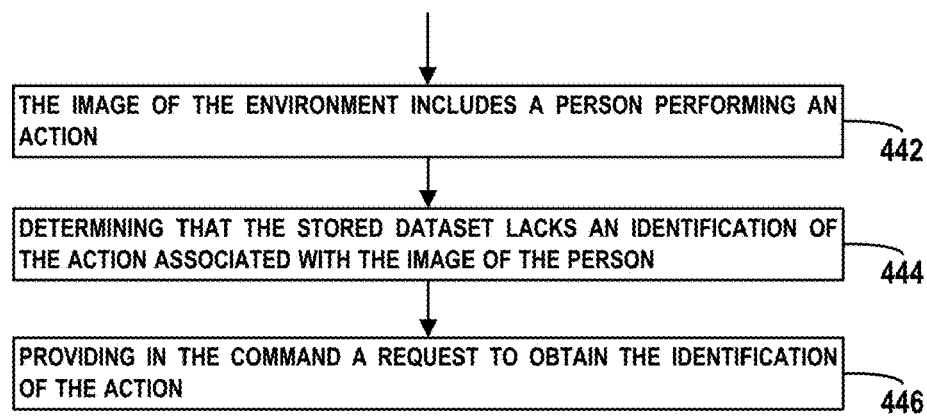
FIG. 10 shows another flowchart of an example method for use with the method, according to an example implementation.

FIG. 10 shows another flowchart of an example method for use with the method 400, according to an example implementation. At block 442, functions include determining that the image of the environment includes a person performing an action, and at block 444, functions include determining that the stored dataset lacks an identification of the action associated with the image of the person. At block 446, functions include providing in the command a request to obtain the identification of the action. In this example, the gameplay directs the user to help label activities that are being performed to train the computing device 108, and store such information in the dataset. In this manner, the dataset can also be referenced to perform activity recognition functions, for example.

Figure 11:
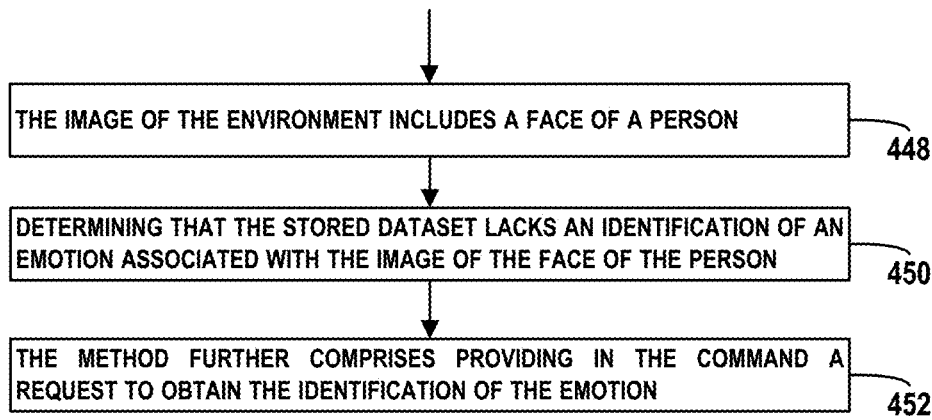
FIG. 11 shows another flowchart of an example method for use with the method, according to an example implementation.

FIG. 11 shows another flowchart of an example method for use with the method 400, according to an example implementation. At block 448, functions include determining that the image of the environment includes a face of a person, and at block 450, functions include determining that the stored dataset lacks an identification of an emotion associated with the image of the face of the person. At block 452, functions include providing in the command a request to obtain the identification of the emotion. In this example, the gameplay has features to enable collection of data of emotions. The gameplay may be further enhanced by requesting a label of a name of the person in the image, and also an identification of an emotion of the person in the image so as to associate a specific emotion to a specific person. People may communicate emotions differently, and the gameplay can be used to train the computing device 108 of how to recognize a specific emotion of a specific person, for example.

Figure 12:
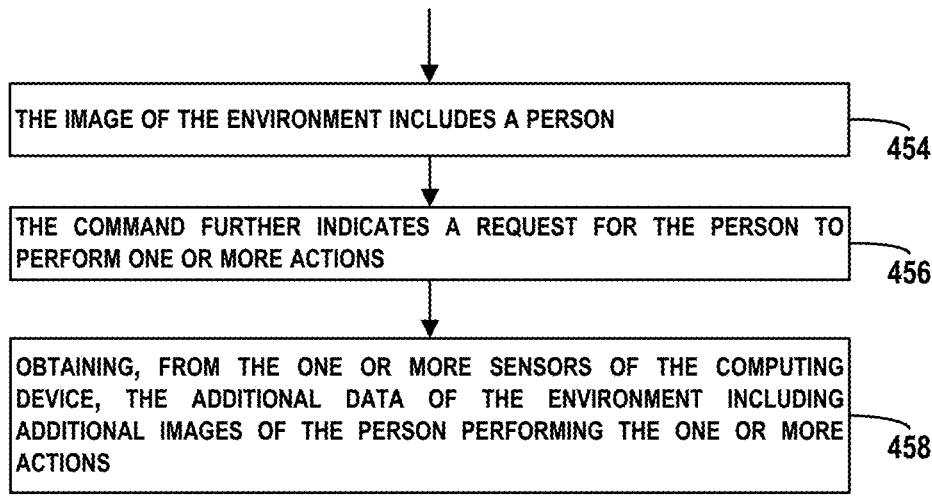
FIG. 12 shows another flowchart of an example method for use with the method, according to an example implementation.

FIG. 12 shows another flowchart of an example method for use with the method 400, according to an example implementation. At block 454, functions include determining that the image of the environment includes a person, and at block 456, functions include providing in the command a request for the person to perform one or more actions. At block 458, functions include obtaining, from the one or more sensors of the computing device, the additional data of the environment including additional images of the person performing the one or more actions. An example scenario includes gameplay prompting a person to perform certain actions so that the computing device 108 can collect data associated with those actions. An action can be anything, such as requesting the person to "dance", and upon successful data collection of the person dancing, the points and/or rewards are provided during gameplay on the interface 129. The computing device 108 may then associate the collected data (e.g., images and video of the person dancing) to the action or verb of "dance".

In another similar example, the gameplay may prompt the person to show the computing device 108 a particular object so that data of that object can be collected. In this way, the gameplay directs the user to collect data of objects for which the dataset is lacking details, and thus, the gameplay controls data collection to be that of items of interest. The gameplay can further direct specific types of additional data to be collected (e.g., specific pose of the object, etc.).

In yet another similar example, the gameplay may prompt the user to smile, frown, or perform a facial expression with any type of emotion. Then, using a front-facing camera, the computing device 108 can capture an image of the person and associate the image with the particular emotion. This further enables generation of the dataset to include images of particular emotions that are labeled, for example.

Figure 13:
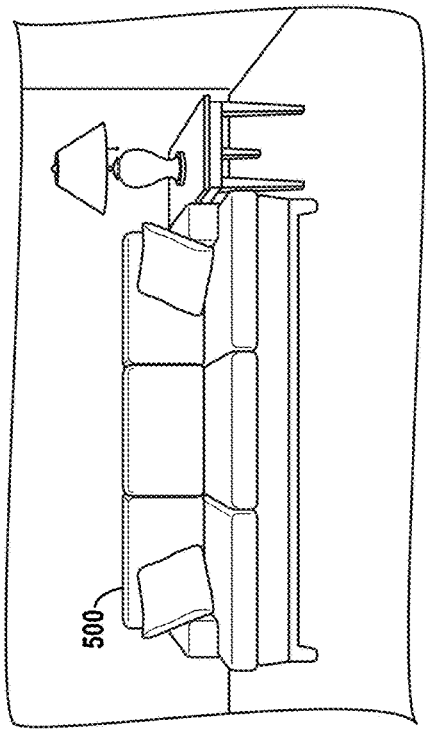
FIG. 13 is a conceptual illustration of an example two-dimensional (2D) image of the environment including an object, according to an example implementation.

FIG. 13-18 are conceptual illustrations of data collected of the environment, according to example implementations. FIG. 13 is a conceptual illustration of an example two-dimensional (2D) image of the environment including an object 500, for example, a couch. Following, the computing device 108 can determine, based on a first comparison of the image to a stored dataset in a database, that the stored dataset lacks one or more details of the environment and/or the object 500, and then provide a command that indicates a request to obtain additional data of the environment. As such, additional data of the couch and the environment of the couch can be obtained.

Figure 14:
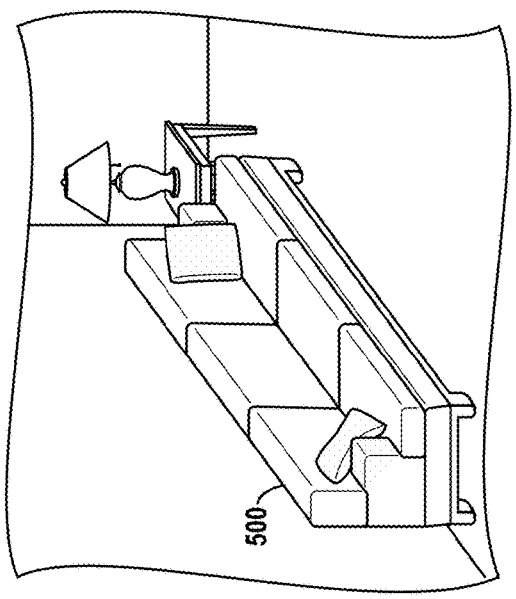
FIG. 14 is a conceptual illustration of example additional data of the environment, according to an example implementation.

FIG. 14 is a conceptual illustration of example additional data of the environment, according to an example implementation. In FIG. 14, a different perspective or pose of the object 500 is captured by the camera of the computing device 108 or the robotic device 200. The perspective is shown to be from an angle to provide a different viewpoint, for example.

Figure 15:
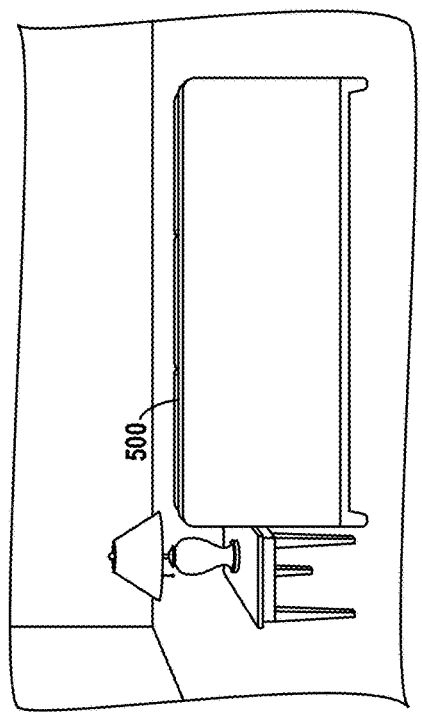
FIG. 15 is a conceptual illustration of another example additional data of the object, according to an example implementation.

FIG. 15 is a conceptual illustration of another example additional data of the object 500, according to an example implementation. In FIG. 15, another different perspective or pose of the object 500 is captured by the camera of the computing device 108 or the robotic device 200. The perspective is shown to be from a backside to provide a different viewpoint, for example.

Figure 16:
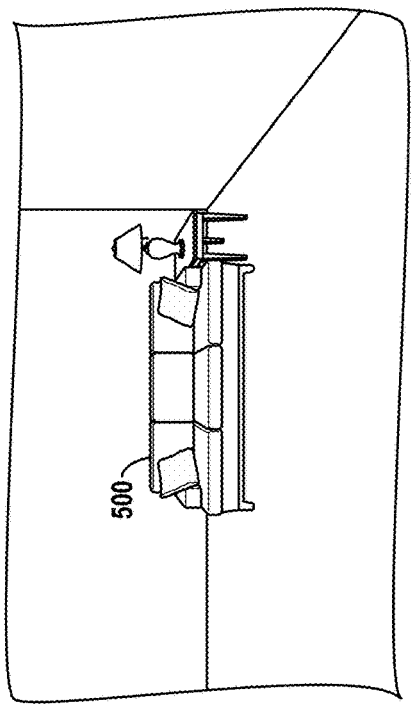
FIG. 16 is a conceptual illustration of another example additional data of the object, according to an example implementation.

FIG. 16 is a conceptual illustration of another example additional data of the object 500, according to an example implementation. In FIG. 16, an image of the object 500 is captured from a farther distance away to provide yet another perspective viewpoint.

Figure 17:
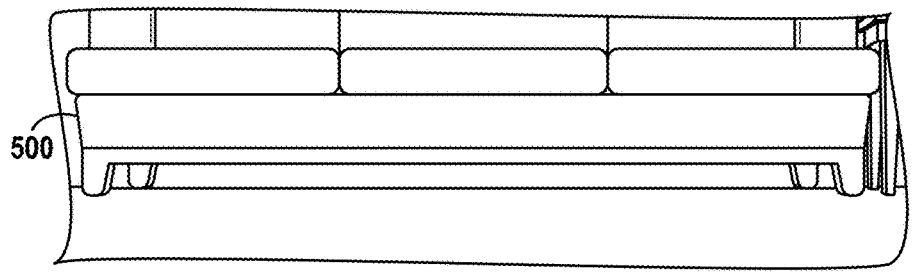
FIG. 17 is a conceptual illustration of another example additional data of the object, according to an example implementation.

FIG. 17 is a conceptual illustration of another example additional data of the object 500, according to an example implementation. In FIG. 17, an image of the object 500 is captured from a closer distance to provide yet another perspective viewpoint of a portion of the object 500.

Figure 18:
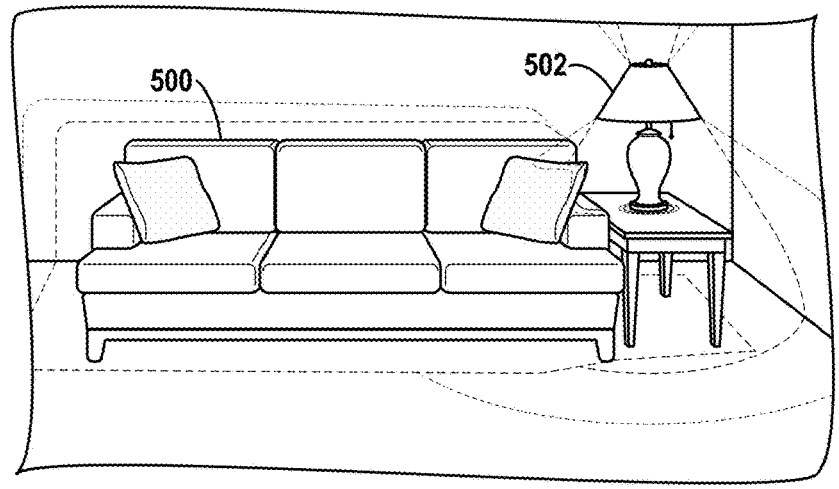
FIG. 18 is a conceptual illustration of another example additional data of the object, according to an example implementation.

FIG. 18 is a conceptual illustration of another example additional data of the object 500, according to an example implementation. In FIG. 18, an image of the object 500 is captured with different lighting in place. For example, in FIG. 18, a lamp 502 is on and shines lights onto and adjacent to the object 500.

Following capture of any one or more of the additional data as conceptually shown in FIGS. 14-18, the computing device 108 then determines, based on a second comparison to the stored dataset in the database, whether the additional data of the environment differs from data of the environment in the stored dataset. When the data differs, the computing device 108 provides one or more points for gameplay on an interface 129 of the computing device 108.

Figure 19:
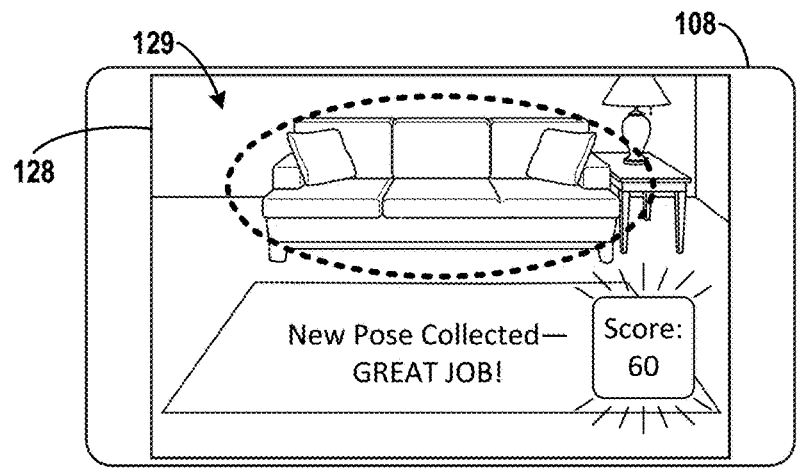
FIG. 19 is an illustration of example gameplay on the interface of the display of the computing device, according to an example implementation.

FIG. 19 is an illustration of example gameplay on the interface 129 of the display 128 of the computing device 108, according to an example implementation. As shown in FIG. 19, the computing device 108 makes the determination that new data is collected, that is not previously included in the dataset stored in the database, and awards points during gameplay (e.g., "Score: 60"). The new data can be highlighted on the interface 129 by circling an area or object of interest that was captured and represented by the new data, for example.

Figure 20:
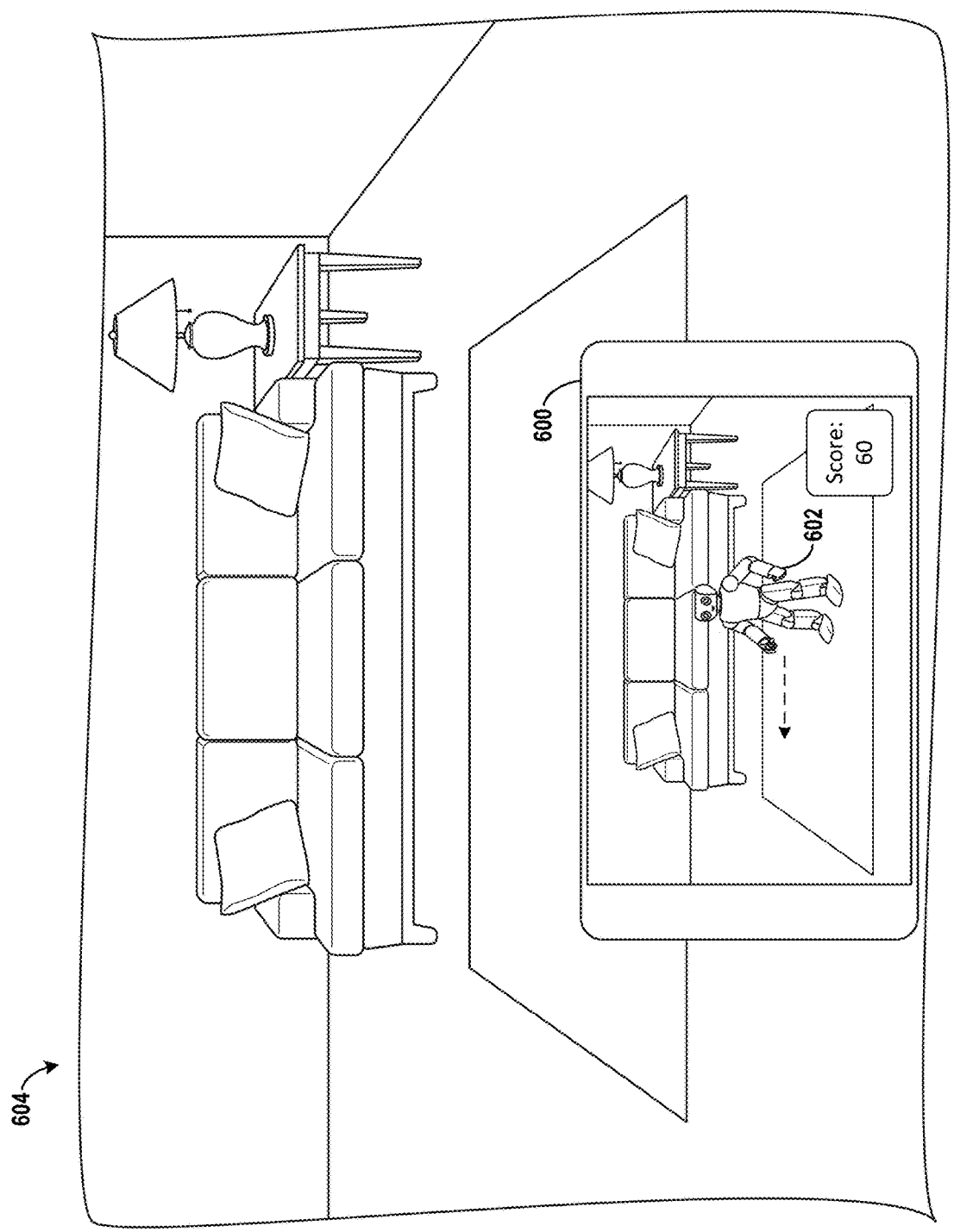
FIG. 20 is a conceptual illustration of an example scenario for execution of methods described herein, according to an example implementation.

FIG. 20 is a conceptual illustration of an example scenario for execution of methods described herein, according to an example implementation. An example computing device 600 is shown with an AR graphical character 602 overlaid onto a view of the environment 604 as captured by a camera of the computing device 108. The computing device 108 is programmed to cause the AR graphical character 602 to move on the display 128 of the computing device 108 as an indication to travel into an area of the environment for which the stored dataset in the database 135 lacks the one or more details of the environment. In this example, the AR graphical character 602 moves to the left encouraging the user to also move the computing device 108 to the left to cause the computing device 108 to capture information in that direction representative of the environment. Once successful information capture is confirmed that differs from data in the stored dataset, an amount of points are awarded as a score during gameplay, as shown in FIG. 20.

In some examples, a geometry of the environment may be presented as a portion of the game itself by overlaying graphics onto the interface 129 for the AR graphical character 602 to interact with, and while the user moves the computing device 108 to enable the AR graphical character 602 to interact with the different geometry, data collection can be performed using any of the sensors 132 of the computing device 108. Such methods use gameplay to encourage users to capture more detail of the environment or to capture areas not previously scanned, for example.

Any computing device could generate an augmented reality (AR) graphic, such as a mobile computing device (e.g., smartphone or tablet) or wearable computing device (e.g., head-mounted display). Likewise, the gameplay may include virtual gameplay between a physical object and a software robot in the form of the AR graphical character 602 that is rendered during a simulation. For instance, a computing device could generate a simulation of a software robot moving through the environment using the log of sensor data. In the simulation, the software robot may take a same path or a different path than the path taken by a robotic device that captured the log of sensor data. If the software robot takes a different path, the different path may involve virtual gameplay between the software robot and a physical object in the environment, and the computing device can render the gameplay accordingly.

Example methods and devices described herein are useful to generate robust datasets of environments in a manner that encourages users to do so through gameplay. Various different types of games can be implemented for the gameplay, and each game may cause data to be collected. These data collection techniques remove the need to manually code objects, environments, etc., and provide an amusing game for a user to play.

Various games can be implemented that creates challenges, such as asking a user to complete a set of tasks that enables the computing device 108 to generate the dataset that may be used for machine learning.

In addition, various games can be created with useful results, such as a home insurance game in which the AR graphical character 602 runs throughout the house in areas where locks and alarm systems are installed to determine an appropriate discount to receive on the home insurance. A full mapping of the home can also be generated by following the AR graphical character 602 throughout the home to verify a size of the home and assets contained therein, and all such information may be useful in determination of home insurance premiums, for example.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination, and all of such possibilities are intended to be within the scope of the disclosure.

The description of the different advantageous arrangements has been presented for purposes of illustration and description, and is not intended to be exhaustive or limited to the examples in the form disclosed. After reviewing and understanding the foregoing disclosure, many modifications and variations will be apparent to those of ordinary skill in the art. Further, different examples may provide different advantages as compared to other examples. The example or examples selected are chosen and described in order to best explain the principles, the practical application, and to enable others of ordinary skill in the art to understand the disclosure for various examples with various modifications as are suited to the particular use contemplated.

What is claimed is:

1. A computer-implemented method, comprising:
   analyzing an image of an environment to detect an object in the environment;
   responsive to detecting the object, obtaining, from one or more sensors of a computing device, data of one of a plurality of available data types describing a detail of the object in the environment;
   determining, based on a comparison of the data to a stored dataset in a database, that the stored dataset lacks the detail of the object, the stored dataset including data describing other details of the object of at least some of the plurality of available data types; and
   responsive to determining the data includes the detail that the stored dataset lacks, providing one or more game elements for use in gameplay on an interface of the computing device.

2. The computer-implemented method of claim 1, wherein the environment comprises a house, and wherein the object in the environment is a specific room in the house, wherein providing the one or more game elements comprises:
   providing information indicating a request to obtain additional data relating to the specific room in the house.

3. The computer-implemented method of claim 1, wherein the one or more sensors of the computing device include a depth camera and wherein obtaining, from the one or more sensors of the computing device, the data describing the detail of the object in the environment comprises:
   obtaining, using the depth camera, one or more depth images of the object in the environment.

4. The computer-implemented method of claim 1, wherein the one or more sensors of the computing device include a microphone, and wherein obtaining, from the one or more sensors of the computing device, the data describing the detail of the object in the environment comprises:
   obtaining, using the microphone, audio from the environment.

5. The computer-implemented method of claim 1, wherein the one or more sensors of the computing device include an inertial measurement unit (IMU), and wherein obtaining, from the one or more sensors of the computing device, the data describing the detail of the object in the environment comprises:
   obtaining, using the IMU, movement data of the computing device in the environment.

6. The computer-implemented method of claim 1, wherein the one or more sensors of the computing device include a motion tracking camera, and wherein obtaining, from the one or more sensors of the computing device, the data describing the detail of the object in the environment comprises:
   obtaining, using the motion tracking camera, movement data of the object in the environment.

7. The computer-implemented method of claim 1, wherein the one or more sensors of the computing device include a proximity sensor, and wherein obtaining, from the one or more sensors of the computing device, the data describing the detail of the object in the environment comprises:
   obtaining, using the proximity sensor, proximity data of the object in the environment within a range of the computing device.

8. The computer-implemented method of claim 1, further comprising:
   generating a floorplan of the environment based on the data describing the detail of the object in the environment.

9. The computer-implemented method of claim 1, wherein determining that the stored dataset lacks the detail of the object comprises:
   receiving, from a server, an identification of the object based on the data describing the detail of the object;
   retrieving the stored dataset from the database, the stored dataset corresponding to the object; and
   comparing the data describing the detail of the object to the stored dataset from the database to determine that the data describing the detail of the object is not included in the dataset from the database.

10. The computer-implemented method of claim 1, wherein the one or more game elements for gameplay include at least one of:
    one or more points;
    one or more achievements;
    one or more levels; or
    one or more ranks on a leaderboard.

11. A non-transitory computer-readable storage medium with encoded instructions that, when executed by a computer system, cause the computer system to perform steps comprising:
    analyzing an image of an environment to detect an object in the environment;
    responsive to detecting the object, obtaining, from one or more sensors of a computing device, data of one of a plurality of available data types describing a detail of the object in the environment;
    determining, based on a comparison of the data to a stored dataset in a database, that the stored dataset lacks the detail of the object, the stored dataset including data describing other details of the object of at least some of the plurality of available data types; and responsive to determining the data includes the detail that the stored dataset lacks, providing one or more game elements for use in gameplay on an interface of the computing device.

12. The storage medium of claim 11, wherein the environment comprises a house, and wherein the object in the environment is a specific room in the house, wherein providing the one or more game elements comprises:

providing information indicating a request to obtain additional data relating to the specific room in the house.

13. The storage medium of claim 11, wherein the one or more sensors of the computing device include a depth camera and wherein obtaining, from the one or more sensors of the computing device, the data describing the detail of the object in the environment comprises:

obtaining, using the depth camera, one or more depth images of the object in the environment.

14. The storage medium of claim 11, wherein the one or more sensors of the computing device include a microphone, and wherein obtaining, from the one or more sensors of the computing device, the data describing the detail of the object in the environment comprises:

obtaining, using the microphone, audio from the environment.

15. The storage medium of claim 11, wherein the one or more sensors of the computing device include an inertial measurement unit (IMU), and wherein obtaining, from the one or more sensors of the computing device, the data describing the detail of the object in the environment comprises:

obtaining, using the IMU, movement data of the computing device in the environment.

16. The storage medium of claim 11, wherein the one or more sensors of the computing device include a motion tracking camera, and wherein obtaining, from the one or more sensors of the computing device, the data describing the detail of the object in the environment comprises:

obtaining, using the motion tracking camera, movement data of the object in the environment.

17. The storage medium of claim 11, wherein the one or more sensors of the computing device include a proximity sensor, and wherein obtaining, from the one or more sensors of the computing device, the data describing the detail of the object in the environment comprises:

obtaining, using the proximity sensor, proximity data of the object in the environment within a range of the computing device.

18. The storage medium of claim 11, further comprising:

generating a floorplan of the environment based on the data describing the detail of the object in the environment.

19. The storage medium of claim 11, wherein determining that the stored dataset lacks the detail of the object comprises:

receiving, from a server, an identification of the object based on the data describing the detail of the object;

retrieving the stored dataset from the database, the stored dataset corresponding to the object; and comparing the data describing the detail of the object to the stored dataset from the database to determine that the data describing the detail of the object is not included in the dataset lacks from the database.

20. The storage medium of claim 11, wherein the one or more game elements for gameplay include at least one of:

one or more points;

one or more achievements;

one or more levels; or one or more ranks on a leaderboard.

* * * * *

UNITED STATES PATENT AND TRADEMARK OFFICE
CERTIFICATE OF CORRECTION

PATENT NO. : 11,110,343 B2
APPLICATION NO. : 16/377095
DATED : September 7, 2021
INVENTOR(S) : Hickman et al.

Page 1 of 1

It is certified that error appears in the above-identified patent and that said Letters Patent is hereby corrected as shown below:

On the Title Page

In Column 2, item (56), under "Other Publications", Line 2, delete "PCT/I B2018/056852," and insert -- PCT/IB2018/056852, --, therefor.

In Column 2, item (57), under "Abstract", Line 1, delete "obtaining, obtaining," and insert -- obtaining, --, therefor.

In the Claims

In Column 20, in Claim 19, Line 29, after "dataset" delete "lacks".

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*